United States Patent Office 3,647,630
Patented Mar. 7, 1972

---

3,647,630
ENZYMATICALLY ACTIVE COMPOSITION HAVING AN INSOLUBILIZED PROTEASE ENZYME COVALENTLY BONDED TO A WATER INSOLUBLE POLYANHYDROGLUCOSE
Neal E. Franks, Greenhills, Ohio, assignor to The Procter & Gamble Company, Cincinnati, Ohio
No Drawing. Filed Sept. 29, 1969, Ser. No. 862,072
Int. Cl. C08g 7/02
U.S. Cl. 195—63 R          4 Claims

ABSTRACT OF THE DISCLOSURE

An enzymatically active, water-soluble composition is provided consisting essentially of (1) a protease enzyme covalently bonded to a water-insoluble matrix which is a diazotized anthranilate ester of a polyanhydroglucose compound. The composition is useful for applications where it is desired to employ a water-insoluble enzymatically active catalyst having a preformed matrix with good mechanical characteristics and specifically selected enzyme activity.

BACKGROUND OF THE INVENTION

(I) Field of the invention

This invention relates to the field of insolubilization of proteolytic enzymes by attaching them by chemical means to an insoluble matrix. Both compositions and processes are described.

(II) Description of the prior art

Enzymes are organic (protein) catalytic agents produced by living organisms. They have the unique capacity of speeding up chemical reactions without themselves being altered during the reaction. Enzymes are highly specific catalytic agents, each one having a specific type reaction which it catalyzes. Two systems of nomenclature are employed to designate the individual enzymes. One is based on the name of the substrate on which the enzyme acts, and the other is based on the type of reaction which is involved. Examples of the former nomenclature system are protease which act on proteins, carbohydrases which act on carbohydrates, lipases which act on lipids (fats) and esterases which act on esters. Examples of the latter nomenclature system, based on the type of reaction catalyzed, is an oxidase which catalyzes oxidation reactions, a reductase which catalyzes reduction reactions, a decarboxylase which catalyzes removal of $CO_2$ and a dehydrogenase which catalyzes removal of hydrogen.

Because of their unique properties, enzymes are highly useful as organic catalysts in numerous areas including industrial, analytical, and detergency applications.

For many applications a water-soluble enzyme can satisfactorily be used. This is not the case, however, where the enzymes should not be present in the final reaction mixture or product. In these cases where it is desired to recover or remove the enzyme, the water-soluble property of the enzyme makes separation difficult and tedious. These separation problems can be overcome by employing insolubilized enzymes, for instance, as in a packed column.

It is an object of this invention to provide an insolubilized enzyme composition useful in many applications. An important advantage of an insolubilized enzyme composition is that it readily can be removed from catalyzed reaction solution or mixture by simple filtration or centrifugation processes. The insolubilized enzyme composition of the present invention can be used to remove haze from beer by hydrolysis of insoluble beer proteins to soluble peptides and amino acids. Such an application is described by G. Kay in Insolubilized Enzymes, Process Biochemistry, August 1968. Another illustration of the usefulness of insolubilized enzyme compositions is described by Henry C. Isliker in Purification of Antibodies by Means of Antigens Linked to Ion Exchange Resins, Annals New York Academy of Sciences, 57,225, 1953. No description is known in the literature on the use of insolubilized enzymes in detergent compositions.

A major concern in modifying the physical form of enzymes is the effect it might have upon the activity and stability of the enzyme. The literature gives little insight into this important aspect of enzyme technology.

For instance, G. Kay in the article by him noted above states:

"Unfortunately, the assumption that insoluble forms are more stable than free enzymes is not as simple as it at first seems. Depending on the method of insolubilization, the enzyme may not be stabilized at all and in some cases stability may even be reduced."

Such statements would lead one to expect that enzymes which are bound to an insoluble carrier or resinous support would retain only fractions of their native activities indeed if any at all. In addition, there is also a risk not only of destroying enzyme activity and stability but also of adversely affecting such characteristics as specificity and pH activity profiles.

A study described by Tosa et al., Studies on Continuous Enzyme Reactions I. Screening of Carriers in Preparation of Water-Insoluble Aminoacylase published in Enzymologia 31 (4) (1966) notes the important problems mentioned above. The article then contrasts the several methods known to convert enzymes into water-insoluble derivatives. These include covalent binding, electrostatic attachment, diazo-coupling, peptide-bond methods, and others.

BRIEF SUMMARY OF THE INVENTION

According to the present invention, an enzymatically active, water-insoluble composition is provided which consists of a protease enzyme covalently bonded to a water-insoluble matrix which is a diazotized anthranilate ester of a polyanhydroglucose compound such as cellulose, starch and cross-linked dextran. The term "matrix" is used herein synonymous with "carrier" or "support."

The enzyme employed herein is a protease enzyme derived either from a microorganism such as a *Bacillus subtilis* organism, or one obtained from mammalian systems, e.g. pancreatin or from vegetable systems, e.g., papain, bromelin. The surface attachment of bonding between the resin matrix and the enzyme molecule is not known with certainty.

DETAILED DESCRIPTION OF THE PREFERRED EMBODIMENTS

By practicing the invention, a composition of matter is provided comprising a specifically selected insolubilized protease enzyme attached to a specific water-soluble matrix in such a way that the enzymatic activity is usefully and substantially preserved.

Water-insoluble matrix

The water-insoluble matrix employed in the present invention is a diazotized anthranilate ester of a polyanhydroglucose compound such as cellulose, starch, and cross-linked dextran.

More specifically, the matrix is a material having a formula

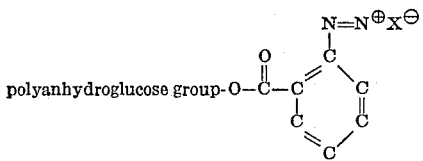

in which the polyanhydroglucose group is cellulose, starch, or dextran cross linked with epichlorohydrin; X is a chlorine or bromine anion; said matrix containing from .5 to 1.5% nitrogen.

The water-insoluble matrix is prepared by reacting a polymeric polyhydroxylic material which is a polyanhydroglucose compound with isatoic anhydride to prepare a reaction product which is an anthranilate ester of the polyanhydroglucose compound. The anthranilate ester is then diazotized to form the water-insoluble matrix which is then reacted with a protease enzyme to form the insolubilized enzymatically-active composition of the present invention.

The starting polyanhydroglucose compound can be cellulose, starch, or an epichlorohydrin cross-linked dextran. Each of these materials should be used in their insoluble form. This includes particulate forms including fiberous materials and gels. The cellulose can have a molecular weight in the range of 20,000 to 2,000,000 and preferably be in the range of 200,000 to 2,000,000. Suitable celluloses are those obtained from seed fibers such as cotton, kapok, and other flosses, woody fibers such as pine, bast fibers such as straw, flax, hemp, ramie, and leaf fibers such a as sisal and manila hemp. Cellulose, a carbohydrate constituent of the walls and skeletons of vegetable cells, is a polymer of the glucose residue units:

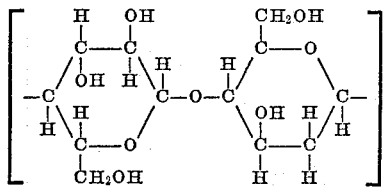

The term starch represents a group of carbohydrates or polysaccharides naturally occurring in many plant cells. The structure has not yet been precisely determined. Starch granules, however, are known to consist of at least two fractions: amylopectin, α-amylose, or α-starch, which is a less soluble fraction; and amylose, β-amylose, or β-starch which is a more soluble fraction. Suitable sources of unmodified starch granules are corn, potato, tapioca, rice, and wheat.

Dextran is rendered water-insoluble by a cross-linking reaction with epichlorohydrin. Dextran is a gummy, fermentable carbohydrate produced by certain cocci from molasses, beet-juice, milk or wine. A water-insoluble dextran cross-linked with epichlorohydrin is used hereinafter to demonstrate the present invention. In this respect it is representative of both starch and cellulose.

Specifically the cross-linked dextrans employed in the examples below are commercially available as Sephadex G-25™ and Sephadex G-50™. These materials are modified dextrans of microbial origin in which cross linking (by epichlorohydrin) is controlled within well-defined limits to give three dimensional networks of interstices or pores. These materials have abundant hydroxyl groups present in the reticulated polysaccharide structure which causes them to swell in water and aqueous solutions thereby forming swollen gels. These materials are nonionic, dry insoluble powders composed of microscopic beads. They come in different mesh sizes and are tightly cross-linked.

The types and column dimensions of Sephadex G-25 and Sephadex G-50 are given below in Table I.

TABLE I

| Type | Approximate exclusion limit (MW) | Water regain (g. $H_2O$/g. dry gel) | Wet density (g./cm.$^3$) | Particle size (microns) | Bed volume/ ml./g. dry gel |
| --- | --- | --- | --- | --- | --- |
| Sephadex G-25 | 5,000 | 2.5±0.2 | 1.13 | | 5 |
| Fine | | | | 20-80 | |
| Coarse | | | | 100-300 | |
| Sephadex G-50 | 10,000 | 5.0±0.3 | 1.07 | | |
| Fine | | | | 20-80 | |
| Coarse | | | | 100-300 | |

The cross-linked (epichlorohydrin) dextrans are insoluble in water, salt solutions, bases, weak acids, and dilute solutions of strong acids.

The starting water-insoluble polyanhydroglucose material, whether it is cellulose, starch, or a cross-linked dextran as described above is reacted with isatoic anhydride to form an anthranilate ester.

The reaction of isatoic anhydride with the polyhydroxylic matrix can be described as below:

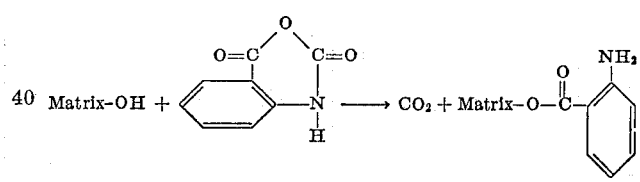

The reaction is best performed in an aqueous environment as described by C. L. Mehltretter in Fluorescent Compounds and $A_{20}$ Dyes from Starch Anthranilates, Industrial and Engineering Product Research and Development, 8, No. 1, p. 77, March 1969. The anhydride portion of the isatoic anhydride is in an activated state and readily reacts with nucleophilic species. By performing this reaction in a slightly alkaline environment, some of the hydroxyl residues in the matrix are converted to the alkoxide form (Matrix—$O^-$) which react with the anhydride. Mehltretter uses aqueous sodium carbonate to achieve this end; aqueous sodium bicarbonate also suffices. Not all of the isatoic anhydride reacts with the matrix, but is hydrolyzed instead to sodium anthranilate and $CO_2$.

A reaction temperature of 2°–50° C. is the desirable range in which to perform the reaction. Stirring is necessary to assure the uniform reaction of isatoic anhydride with the matrix. Isatoic anhydride has a solubility in water at room temperature of less than 0.7% (wt./vol.). To achieve a homogeneous reaction, it is desirable to add an inert co-solvent to the reaction mixture. Dimethylformamide, N-methylpyrrolidine, or dimethylacetamide added to the reaction mixture in equal parts, or less, dissolve the isatoic anhydride in the reaction mixture. Reaction times of 2 hours are sufficient, but reaction times of up to 24 hours are acceptable. The weight ratio of the matrix to isatoic anhydride can be as great as 1:1. In practice, it is best held at 5–10:1. This ratio yields a matrix with a $N_2$ content of 0.55–1.1% and a degree of substitution of 0.1–0.2.

The ester formed by the preceding reaction has the following formula:

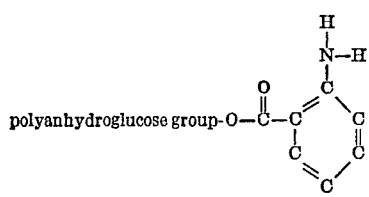

The matrix anthranilate ester is separated from the reaction mixture by either filtration or centrifugation. Removal of unreacted isatoic anhydride from the matrix is best accomplished by washing the matrix with several volumes of the inert cosolvent employed in the reaction. It is also necessary to remove the isatoic anhydride hydrolysis products, anthranilic acid and sodium anthranilate. This is best accomplished by exhaustive washing with aqueous bicarbonate or carbonate. This is easily monitored by the cessation of fluorescence of the washings under ultraviolet light.

The next step in the preparation of the matrix is the diazotization of the anthranilate ester of the polyanhydroglucose material.

This is a known reaction and involves a reaction between nitrous acid $HNO_2$ and the ester. The general technique of making diazo compounds of this is described by Mehltretter in the above-cited article.

The reaction product from the diazotization step is a compound having the formula given above. The X anion will be determined by whatever means is employed in the diazotization step; typically, it is a halogen or a weak organic acid. In a classic embodiment in which nitrous acid is generated in situ by a reaction between acetic acid or propionic acid and sodium nitrite, the X anion is an acetoxy group or a propoxy group. Hydrochloric acid and hydrobromic acid reacted with sodium nitrite result in the anion being chloride and bromide respectively.

In order to obtain the maximum benefits from the present invention, the insolubilized composition should contain from .5% to 1.5%, preferably from .75% to 1.3% nitrogen. When less than .5% is present, an insufficient amount of enzyme attaching sites are available. No additional need appears to exist for exceeding 1.5% nitrogen.

Enzymes

Enzymes are solid, catalytically active, naturally occurring materials which promote remarkable synthesis and decompositions. They act as catalysts and speed up the chemical reactions which occur in all living cells as well as numerous industrial and analytical areas. In the area of detergency, also, enzymes are known to act upon and thereby degrade or alter one or more types of soils or stains encountered in household cleaning situations, including, for example, laundering, dishwashing (the term used in a generic sense to include glassware as well as metallic implements and appliances), and other typical household and hard surface cleaning situations. Enzymes are effective in removing soils or stains from soiled substrates or to render the soil and stains more easily removable by a typical detergent washing step. In this context, both degradation and alteration of the soil caused by enzymes contribute to more effective overall cleaning. As used herein, the term enzyme "activity" refers to the ability of an enzyme to act upon soils and stains (degrade or alter) and enzyme stability denotes the ability of an enzyme to remain in an active state.

The enzymes which can be chemically bonded to the above-identified matrices while preserving substantial enzymatic activity are protease enzymes from the mammalian sources or from microorganisms such as the Bacillus subtilis organism. Proteases catalyze the hydrolysis of the peptide linkage of proteins, polypeptides and related compounds to free amino and carboxyl groups and thus break down the protein structure in soil. Specific examples of proteases suitable for use in this invention are pepsin, trypsin, chymotrypsin, collagenase, keratinase, elastase, subtilisin, papain, bromelin, aminopeptidase, aspergillopeptidase A and B. Preferred proteases are serine proteases which are active in the neutral to alkaline pH range and one produced from microorganisms such as bacteria, fungi or mold. The serine proteases which are procured by mammalian systems, e.g. pancreatin, are useful, especially in acid situations.

Enzymes derived from *Bacillus subtilis* are referred to as subtilisins and are generally identified as alkaline proteases because of their activity in alkaline pH's on protein substrates. Three strains of *Bacillus subtilis* microorganisms are commonly mentioned in the literature. These are the Carlsberg strain, the BPN' strain and the BPN strain. There is convincing evidence that the alkaline protease enzyme derived from the BPN' strain is undistinguishable from the enzyme derived from the BPN strain. Consequently, for purposes of completely describing and fully understanding the present invention, the designations of BPN and BPN' are equated and the term BPN is used herein to encompass BPN'.

Depending on the exact process employed for making enzyme preparations, there may also be present minor amounts of other materials having enzymatic activity, such as neutral protease, lipases, and amylase enzymes. The presence of minor amounts of these other materials does not materially interfere with the satisfactory practice of the present invention. Besides amylases which act on carbohydrates, lipases which act on lipids and neutral proteases which have optimum activity on proteolytic substrates in a neutral pH range, other materials can also be present in minor amounts depending also on the specific processes used. Also encompassed by the term BPN are mutated strains of this microorganism. Such mutated strains can produce enzymes having characteristics different from the original organism. While such changed characteristics may be evident from different ratios of alkaline protease, neutral protease and amylase produced, the alkaline protease is generally present as the predominant enzymatic component.

According to a preferred embodiment of this invention, a protease enzyme is used in a pure form to prepare the insolubilized compositions described herein. Such pure enzymes are readily available and many methods are known for preparing and recovering pure enzymes. While pure forms of enzymes are preferred and are demonstrated in the examples given below, crude enzyme fermentation mixtures can also be used. Such mixtures are also readily available and while the amount of enzyme which becomes bound to the matrix may be somewhat less (due to the presence in the enzyme preparation of inert materials), the advantages of this invention are nevertheless achieved.

Crude fermentation mixtures as contrasted with pure enzymes ordinarily contain up to about 80% active proteases and typically 2% to about 50%. The balance to 100% consists of powdered inert materials. The powdered materials can comprise inorganic alkali metal salts such as sodium sulfate, sodium chloride, potassium silicate, sodium phosphate, inorganic alkaline earth metal salts such as calcium sulfate, magnesium sulfate, magnesium phosphate, and the like; organic components such as nonenzymatic proteins, carbohydrates, organic clays, starches, lipids, color bodies, and the like. Active enzyme content of a fermentation mixture is directly a result of specific manufacturing methods employed and is not critical herein so long as an effective amount of alkaline protease is attached to the surface of the matrix to satisfactorily achieve the end use for which the composition is to be used.

Pure samples of the protease enzymes described herein are highly active catalysts. For example, a pure *Bacillus subtilis*-derived Carlsberg strain employed herein is characterized by a protease activity unit number on a pure basis of about 7,500,000 units/gram as determined by a well known casein assay method described by B. Hagihara et al., J. Biochem, (Tokyo) 45, 185, (1958) and M. Kunitz, J. Gen. Physiol., 291 (1947). This assay method in general terms comprises exposing a casein substrate to an enzyme and determining the amount of casein hydrolyzed under controlled conditions. Crude fermentation mixtures containing varying amounts of salts and the like noted above ordinarily vary in activity from about 100,000 to 2,000,000 units per gram.

The activities of the proteases of the present invention vary depending largely upon the concentration of neutral and alkaline proteases in the enzymatic composition, upon calcium ion concentration, upon substrate concentration, and upon pH. The pure enzymes per se have molecular diameters of from about 30 angstroms to several thousand angstroms. However, the particle diameters of the enzyme powder as utilized herein are normally much larger due to agglomeration of individual enzyme molecules or addition of inert powdered materials or vehicles such as starch, organic clays, sodium or calcium sulfate or sodium chloride, during enzyme manufacture. Such materials are added after filtration of such solution to precipitate the enzyme in fine form which is then dried. The enzyme powders of this invention are typically fine enough to pass through a Tyler Standard 20 mesh screen (0.85 mm.) although larger agglomerates are often found. Some particles of commercially available enzyme powders are fine enough to pass through a Tyler Standard 100 mesh screen. Generally a major amount of particles will remain on a 150 mesh screen. Thus, the powdered enzymes utilized herein can range in size from about 1 mm. to 1 micron, most generally from 1 mm. to 0.01 mm. The enzymes used in the examples below have particle size distributions in these ranges.

Specific examples of the enzymes useful herein are described fully in an artcile by Smith et al.; "The Complete Amino Acid Sequence of Two Types of Subtilisin, BPN' and Carlsberg," Journal of Biol. Chem., Volume 241, December 25, 1966, at p. 5974. This subtilisin strain is characterized by a tyrosine to tryptophan ratio of about 13 to 1. The reference including its full contents is hereby incorporated by reference.

An X-ray mutated *Bacillus subtilis*-derived subtilisin constitutes another prefered alkaline protease of the present invention. This mutation can be effected in accordance with U.S. Pat. 3,031,380 issued April 24, 1962 to Minagawa et al. by irradiation of a *Bacillus subtilis* organism with X-rays. Subsequent treatment in a conventional manner can be employed to result in the preparation of an enzymatic composition. The disclosure of U.S. Pat. 3,031,380 is hereby incorporated by reference.

Another enzyme product preferred for use in the detergent compositions of this invention, as illustrated in the examples below, is a proteolytic enzyme, a serine protease, manufactured by Novo Industri A/S, Copenhagen, Denmark, and sold under the trade name of Alcalase. Alcalase is described, in a trade bulletin bearing that name which was published by Novo Industri A/S, as a proteolytic enzyme preparation manufactured by submerged fermentation of a special strain of *Bacillus subtilis*. The primary enzyme component of Alcalase is subtilisin. Alcalase is a fine grayish, free-flowing powder having a crystalline active enzyme content of about 6% and a particle size ranging from 1.2 mm. to 0.1 mm. and smaller, about 75% passing through a 150 mesh Tyler screen. The remainder of the powder is comprised primarily of sodium sulfate, calcium sulfate and various inert organic vehicle materials.

Having described the matrix and the suitable enzyme materials necessary to practice this invention, examples are provided demonstrating the present invention. All parts are by weight unless otherwise indicated. Obvious modifications of this invention encompassed by the appended claims are apparent from the following examples.

EXAMPLE I (A) Preparation of anthranilate ester of epichlorohydrin-cross-linked dextran A cross-linked dextran 5 g. (Sephadex G-25 described above) having a molecular weight exclusion limit approximate) of 5,000 and a particle size of 50–150 microns was suspended in 25 ml. of 0.1 M sodium bicarbonate and allowed to equilibrate for 30 minutes. This mixture was stirred at room temperature and a solution of 1 g. of isatoic anhydride in 5 ml. of dimethylformamide was added to the mixture. An additional 5 ml. of dimethylformamide was added to the mixture to bring about solution of the isatoic anhydride. The mixture was stirred for two hours at room temperature during which period the anthranilate ester of cross-linked dextran was formed as the desired reaction product.

Work-up of the anthranilate ester of dextran was performed by filtering and washing the reaction product first with several volumes of dimethylformamide. Sodium anthranilate, arising from hydrolysis of isatoic anhydride during the reaction, was strongly absorbed by the ester reaction product. To insure complete removal of sodium anthranilate, it was necessary to wash the ester reaction product with saturated aqueous sodium bicarbonate until the washings no longer fluoresced under ultraviolet light. The ester reaction product was then washed with distilled water until the washings were neutral to pH indicator paper. The cross-linked dextran anthranilate ester which had a nitrogen content of 1.2% was stored in moist form until needed.

(B) Preparation of diazotized cross-linked dextran anthranilate

Moist cross-linked dextran anthranilate (5 g.) from Part A above, was suspended in 23 ml. of distilled water. Glacial acetic acid 2 ml.) was added to this mixture with stirring. The mixture was chilled to 0–2° C., and a concentrated solution of sodium nitrite in water was added in dropwise with stirring. Addition of sodium nitrite was halted when an excess of this reagent was present as gauged by starch-potassium iodide paper. A diazotization reaction occurred which formed a diazotized dextran anthranilate matrix. This reaction product was stirred an additional 30 minutes before it was isolated by filtration. The diazotized matrix was washed with 200 ml. of ice-water to remove excess acetic acid and sodium nitrite.

(C) Attaching protease enzyme to the diazotized anthranilate ester of cross-linked dextran Crystalline Alcalase (100 mg.—as described above) was dissolved in 5 ml. of 0.2 M sodium acetate: 0.02 M calcium chloride buffer. The pH of this solution was adjusted to 8–8.5 with N sodium hydroxide. This solution was cooled to 0–2° C. and the diazotized cross-linked dextran anthranilate matrix prepared in Part B above was added with stirring. Sodium hydroxide (a one normal solution) was added dropwise to maintain the pH between 8 and 8.5. After two hours, the mixture was allowed to come to room temperature. After base uptake ceased, a column was poured and it was washed with 0.1 M borate, pH 8.8. Unreacted diazogroups on the matrix decomposed during this washing to generate $N_2$; the matrix was transferred to a flask containing 0.2 M borate buffer, pH 9.0. After evolution of $N_2$ had ceased, the reddish matrix was washed with more 0.1 M borate and the activity of the matrix having the insolubilized protease enzyme attached to the diazotized anthranilate ester of cross-linked dextran was measured by a column technique.

The moist active matrix was dried in vacuo at 100° and found to contain 32% solids; hydrolysis of the dried matrix with 6 N-hydrochloric acid and quantitative amino acid analysis of the hydrolysate showed the presence of 3-4 mg. of enzyme/gram of the dried matrix.

EXAMPLE II (A) Preparation of anthranilate ester of epichlorohydrin-cross-linked dextran The procedure described in Part A of Example I was repeated except in this instance the cross-linked dextran had a molecular weight exclusion limit (approximate) of 10,000. The resulting anthranilate ester of epichlorohydrin-cross-linked dextran had a nitrogen content of 1.07%.

(B) Preparation of diazotized cross-linked dextran anthranilate

The moist cross-linked dextran anthranilate (5 g.) from Part A above containing 1.07% nitrogen was diazotized as in Example I.

(C) Attaching protease enzyme to the diazotized anthranilate ester of cross-linked dextran Crystalline trypsin (100 mg.) was dissolved in 5 ml. of 0.2 M sodium acetate-0.02 M calcium chloride buffer was adjusted to pH 8-8.5 with N sodium hydroxide. The solution was cooled to 0° C. and the diazotized cross-linked dextran anthranilate matrix from Part B was added with stirring. The pH dropped initially to 5.5, but was adjusted to 7.5-8.5 by the addition of N sodium hydroxide. The mixture was stirred overnight at 2° C. The supernatant was isolated and the matrix was washed by centrifugation with 0.1 M sodium bicarbonate. A proteolytic assay on the supernatant indicated activity equal to the recovery of half of the starting material. The activity of the matrix was observed using the casein column technique.

EXAMPLE III

In this example a protease enzyme, Bacterial Proteinase Novo, was covalently bonded to the diazotized epichlorohydrin-cross-linked dextran anthranilate matrix prepared in Parts A and B of Example I.

The matrix was added to a solution of 100 mg. of crystalline Bacterial Proteinase Novo in 5 ml., 0.2 M sodium acetate-0.02 calcium chloride at pH 8-8.5. The coupling was initiated at 0° C. and the pH was maintained at 7.5-8.5 by addition of N sodium hydroxide to the stirred mixture. After 3 hours, a column was poured with the insolubilized enzyme-matrix adduct; the column was washed with 0.1 M borate buffer, pH 8.8. The enzyme-matrix adduct was stored at 5° C. in a 0.13 M sodium chloride-0.03 M phosphate buffer, pH 7.0. A portion of the moist matrix was dried in vacuo at 100° C. to yield 27.5% solids. Hydrolysis of the dried matrix in 6 N HCl followed by quantitative amino acid analysis of the hydrolysate showed the presence of 2-3 mg. enzyme/g. of dry matrix.

EXAMPLE IV

The enzymatic activity of the insolubilized enzyme containing adducts prepared in Examples I, II, and III above was determined by a slightly modified assay determination procedure reported by B. Hagihara, H. Matsubara, M. Nakai, and K. Okunuki; Journal of Biochemistry (Tokyo) 45, 185, 1958. Since, according to the present invention, the composition comprises an insolubilized enzyme, the Hagihara et al. procedure requires slight modification. Basically, however, the assay procedure used below applies the principles of the Hagihara et al. technique.

The insolubilized enzyme adducts prepared in Part C of Examples I, II, and III were poured into columns (0.5 cm., I.D., 6-6.5 cm. high). The columns were equilibrated with 0.1 M borate buffer, pH 8.8. A 1.2% solution of casein (Hammersten) obtained from Nutritional Biochemicals, Cleveland, Ohio, was prepared in 0.1 molar borate buffer, pH 8.8, and then passed into the columns. Five ml. fractions of the effluent were collected and 5 ml. of trichloroacetic acid precipitant were added to each fraction. After filtration, the amount of solubles was measured by optical density measurements at a wavelength of 280 millimicrons against an unhydrolyzed casein blank treated with a trichloroacetic acid precipitant. The results were as follows:

TABLE II*

|  | No enzyme-dextran-anthranilate | Insolubilized alcalase enzyme/dextran from Example I | Insolubilized trypsin enzyme/dextran from Example II | Insolubilized BPN enzyme/dextran from Example III |
|---|---|---|---|---|
| Flow rate, ml./min. | 0.6 | 0.6 | 0.1 | 0.6 |
| Fraction: |  |  |  |  |
| 5-10 ml. | <0 | 0.26 | 1.05 | 0.16 |
| 35-40 ml. | 0 | 0.334 | 1.14 | 0.217 |
| Incubation of 5 ml. of hydrolysate from a 20-35 ml. fraction at 30° C. for min. |  |  |  |  |
|  | 0 | 0.342 |  | 0.235 |
| Activity of the insolubilized matrix adduct after storage for 21 days in 0.15 M sodium chloride—0.05 sodium phosphate at 5° C. |  |  |  |  |
| 5-10 ml. |  | 0.235 |  | 0.155 |
| 35-40 ml. |  | 0.312 |  | 0.425 |

*Values given as optical density units at a wavelength of 280 millimicrons.

From the preceding data, it is apparent that each of the water-insoluble enzyme compositions prepared in Examples I, II, and III is active and does hydrolyze casein as evidenced by the observed $O.D._{280}$ readings.

With respect to the compositions of Examples I, II, and III which consist essentially of a protease enzyme attached to a water-insoluble matrix which is a diazotized anthranilate ester of a polyanhydroglucose compound, the following additional points can be noted.

The enzyme is attached covalently and not electrostatically to the matrix. Evidence supporting this statement is the increase in the $O.D._{280}$ between the 5-10 ml. fraction and the 35-40 ml. fraction. Were the enzyme held to the matrix by means of electrostatic interaction, the $O.D._{280}$ of the latter sample should be less than the former due to displacement of the enzyme from the matrix by the protein substrate (casein). Incubation of the hydrolysate offers another cross-check for displacement of enzyme from the matrix. There is less than a 10% difference between the 35-40 ml. fraction and the incubated hydrolysate sample with both Alcalase/dextran (Example I) with BPN/dextran (Example III); this 10% value is within bounds of the experimental error of the casein assay.

Storing the insolubilized adduct in aqueous buffer for a 21 day period caused little activity change. The enzyme per se in solution stored under the same conditions could be expected to lose greater than 50% of its original activity.

In the area of detergency, the enzymatically-active, water-insoluble compositions of the present invention offer a special advantage. Not only can such applications be incorporated into solid detergent compositions of all forms (flakes, powders, granules, tablets, and the like) in an effective amount; they can also be used in conjunction with appliances in which washing processes occur. For instance, the enzymatically active water-insoluble compositions described herein can be used to treat the water which is used in a laundering process. Means can be provided to draw off water from a washing machine to a reservoir containing the composition described herein, and recycling such water after exposure to the insolubilized enzyme composition back into the washing system. In this manner, soil present in the washing solution can be subjected to enzymatic attack with the result that suspended soils will be degraded or altered in a beneficial way. This kind of a treatment can substantially reduce the amount of soil which would tend to redeposit upon the fabrics being washed. A similar process can be applied to all types of washing appliances including dishwashers, commercial bottle washing apparatus, and any other type of washing appliances including dishwashers, commercial bottle washing apparatus, and any other type of washing appliance in which water is used as a washing medium.

When used in conjunction with solid detergent compositions, the enzymatically active water-insoluble compositions described herein can be used at any desired level to achieve the cleaning objective. The insolubilized enzyme compositions of this invention are stable in the presence of organic synthetic soap and nonsoap detergents. By way of example, it is possible to advantageously use the insolubilized enzyme compositions described herein in conjunction with anionic, nonionic, ampholytic, and zwitterionic detergents. Such compositions can also contain builder compounds such as inorganic alkaline builder salts, organic alkaline sesquestering builder salts, or mixtures of such materials. The fact that the compositions described herein are water-insoluble does not prevent their use in household and commercial laundering and cleaning applications, since an effective rinsing step satisfactorily removes any residual water-insoluble material.

The present invention can also be successfully practiced by employing insoluble matrices other than cellulose, starch or cross-linked dextran. For example, one can use an insoluble polymer of polyvinyl alcohol or an insoluble hydrophilic copolymer of vinyl alcohol and some other monomer such as acrylic acid, methacrylic acid, hydroxy ethyl acrylate, or dimethylaminoethyl acrylate.

What is claimed is:

1. A water-insoluble, enzymatically-active composition consisting essentially of a protease enzyme covalently bonded to a water-insoluble matrix having a formula

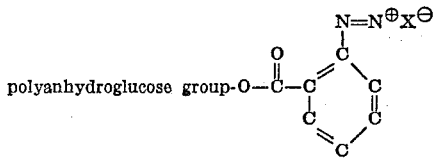

in which the polyanhydroglucose group is water-insoluble cellulose, starch, or an epichlorohydrin-cross-linked dextran; X is an anion selected from halogen or a weak organic acid, said matrix containing from .5 to 1.5% nitrogen, the enzyme being insolubilized as a result of covalent bonding with the matrix.

2. The composition of claim 1 in which the protease enzyme is an alkaline protease.

3. The composition of claim 1 in which the polyanhydroglucose group is epichlorohydrin cross-linked dextran.

4. The composition of claim 1 in which the matrix contains from .75% to 1.3% nitrogen.

References Cited

Axen et al., Nature, Apr. 23, 1966, pp. 367–369.

LIONEL M. SHAPIRO, Primary Examiner

U.S. Cl. X.R.

195—Digest 11